United States Patent
Bull et al.

(10) Patent No.: US 10,230,881 B2
(45) Date of Patent: Mar. 12, 2019

(54) CAMERA HOUSING WITH SLIDABLE IMAGE SENSOR UNIT

(71) Applicant: Axis AB, Lund (SE)

(72) Inventors: David Bull, Lund (SE); John Åkesson, Lund (SE)

(73) Assignee: Axis AB, Lund (SE)

( * ) Notice: Subject to any disclaimer, the term of this patent is extended or adjusted under 35 U.S.C. 154(b) by 56 days.

(21) Appl. No.: 15/593,019

(22) Filed: May 11, 2017

(65) Prior Publication Data

US 2017/0331996 A1 Nov. 16, 2017

(30) Foreign Application Priority Data

May 12, 2016 (EP) ..................... 16169291

(51) Int. Cl.
*H04N 5/225* (2006.01)
*F16M 11/04* (2006.01)
(Continued)

(52) U.S. Cl.
CPC ......... *H04N 5/2259* (2013.01); *F16M 11/048* (2013.01); *G03B 5/00* (2013.01); *G03B 17/08* (2013.01); *G03B 17/55* (2013.01); *H04N 5/2252* (2013.01); *H04N 5/2253* (2013.01); *H04N 5/2254* (2013.01); *H04N 7/10* (2013.01); *H04N 7/183* (2013.01); *F16M 2200/028* (2013.01);
(Continued)

(58) Field of Classification Search
CPC .... H04N 5/2254; H04N 7/183; H04N 5/2252; H04N 5/2259; H04N 5/2253; H04N 7/10; G03B 17/55; G03B 17/08; G03B 5/00; G03B 17/14; G03B 2205/0092; F16M 11/048; F16M 2200/028
See application file for complete search history.

(56) References Cited

U.S. PATENT DOCUMENTS 5,563,659 A 10/1996 Bernhardt et al.
5,801,919 A * 9/1998 Griencewic ........... G06F 1/1686
348/552
(Continued)

FOREIGN PATENT DOCUMENTS

CN 203014962 U 6/2013
CN 205123868 U 3/2016
(Continued)

OTHER PUBLICATIONS

EP 16 16 9291 European Search Report (dated Jun. 22, 2016).

*Primary Examiner* — Gary C Vieaux
(74) *Attorney, Agent, or Firm* — Volpe and Koenig, P.C.

(57) ABSTRACT

The disclosure relates to a camera, comprising a housing, an electronics unit comprising a processor, and an image sensor unit comprising an image sensor and a lens support, the electronics unit being fixed inside the housing, the image sensor unit being slidable inside the housing, the housing being provided with a window through which a scene is viewable for the image sensor, the image sensor unit being slidable relative to the housing so as to allow adjustment of a distance between the image sensor and the window along an adjustment direction, wherein the electronics unit and the image sensor unit are connected to each other via a flexible cable for transmittal of digital image sensor output from the image sensor to the processor in the electronics unit.

17 Claims, 8 Drawing Sheets

(51) Int. Cl.
*G03B 17/55* (2006.01)
*H04N 7/10* (2006.01)
*H04N 7/18* (2006.01)
*G03B 5/00* (2006.01)
*G03B 17/08* (2006.01)
*G03B 17/14* (2006.01)

(52) U.S. Cl.
CPC ...... *G03B 17/14* (2013.01); *G03B 2205/0092* (2013.01)

(56) References Cited

U.S. PATENT DOCUMENTS

| | | | |
|---|---|---|---|
| 6,375,369 B1 | 4/2002 | Schneider et al. | |
| 7,362,372 B2 | 4/2008 | Lyon et al. | |
| 9,386,205 B2 * | 7/2016 | Tsuzuki | G02B 7/102 |
| 9,918,004 B2 * | 3/2018 | Inata | H04N 5/2253 |
| 2002/0140848 A1 | 10/2002 | Cooper et al. | |
| 2007/0019950 A1 | 1/2007 | Tanaka | |
| 2009/0115890 A1 | 5/2009 | Bertollo Conte | |
| 2011/0286735 A1 | 11/2011 | Tremblay | |
| 2011/0310248 A1 * | 12/2011 | McElroy | H04N 5/2254 348/148 |
| 2015/0049243 A1 | 2/2015 | Samuels et al. | |
| 2015/0062409 A1 * | 3/2015 | Tsuzuki | G02B 7/102 348/342 |
| 2015/0256747 A1 | 9/2015 | Grotto et al. | |
| 2016/0127621 A1 * | 5/2016 | Liao | G03B 37/04 348/335 |
| 2017/0126936 A1 * | 5/2017 | Saha | H04N 5/2252 |

FOREIGN PATENT DOCUMENTS

| | | |
|---|---|---|
| DE | 89 00 878 U1 | 3/1989 |
| EP | 2 493 173 A1 | 8/2012 |
| JP | 3 222174 B2 | 10/2001 |
| JP | 2003-015206 A2 | 1/2003 |
| JP | 2005 340948 A | 12/2005 |
| JP | 2008-249782 A2 | 10/2008 |
| KR | 10-1056191 B1 | 8/2011 |

* cited by examiner

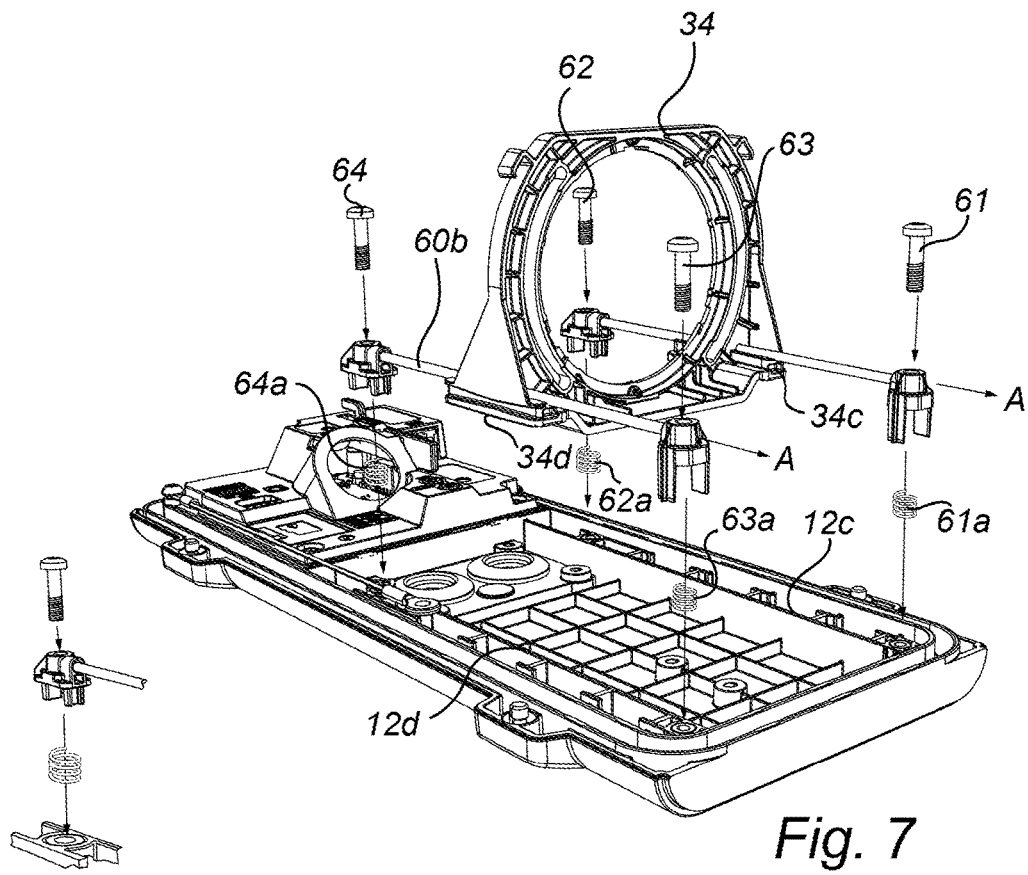
Fig. 7
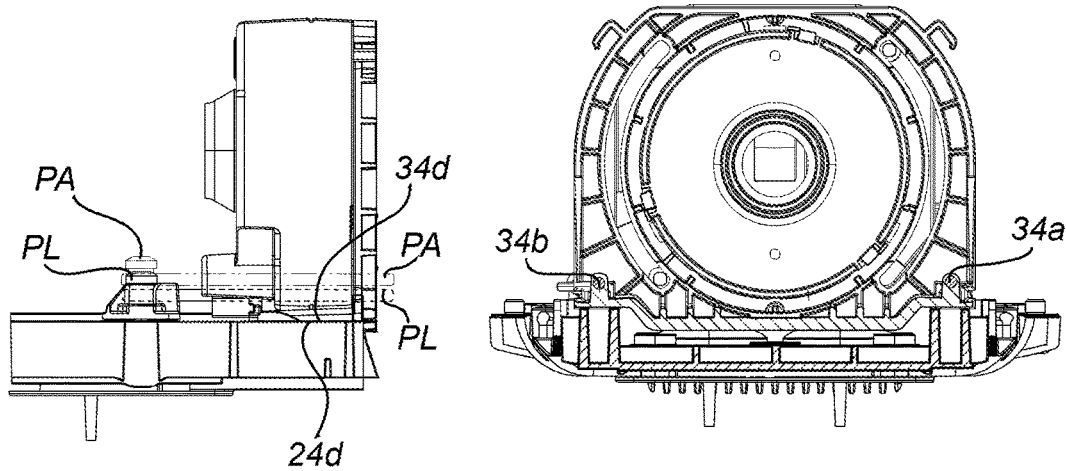
Fig. 8
Fig. 9

CAMERA HOUSING WITH SLIDABLE IMAGE SENSOR UNIT

FIELD OF INVENTION

The invention relates to a camera.

BACKGROUND

Cameras, such as surveillance cameras, for outdoor use need to be protected, e.g., against dust and rain. Sometimes it is also necessary to protect the cameras against vandalism, outdoors as well as indoors.

One common approach to solve this is to install a camera designed for indoor use inside an outdoor housing. Examples of this approach are, e.g., shown in US 2015/0256747 and US 2009/0115890. Such an approach is also applied in the AXIS T93F10 Outdoor Housing. In the latter example there is an optional accessory; a bracket can be purchased if the fixed camera needs to be installed in the so-called corridor format, allowing the housing to remain in the same orientation.

Some cameras are designed to be able to be used with different lenses or lens assemblies adapted for different viewing distances. With different choices of lens, the same camera may be used for anything from close-up surveillance of a door nearby the camera to long-distance surveillance of traffic with the camera positioned on a mast or large traffic sign.

Typically, it is desirable to install the camera inside the outdoor housing with the front end of the lens as close to the window of the outdoor housing as possible to minimize reflections. However, in order to meet requirements concerning protection provided by enclosures for electrical equipment against external mechanical impacts, e.g., protection against vandalism, it is often necessary to position the camera in the housing such that there is a specific minimum distance between the window of the housing and the lens, such that an impact on the window does not damage the lens or the camera.

One problem often associated with this design is that the outdoor housings become bulky.

Another problem associated with this design is that in warm climates the outdoor housings often need to be provided with a fan to provide an air circulation inside the outdoor housing to ensure sufficient cooling of the camera.

The cooling problem has been addressed, e.g., in US 2002/0140848 A1, which discloses the provision of a chamber for a surveillance camera that is designed to be mounted inside a larger camera housing. The internal chamber is sealed and provides a controlled internal environment for the sensitive camera optics and internal electronics. However, with this design there arises a need for sealed feed-through openings through the external housing, both to allow the electrical connectors of the internal camera to extend outside the housing and to provide conduits for adding and removing gases from the internal chamber. This is a complex design which would become even more complex if it were to be designed to accommodate different choices of lens for the camera inside the internal chamber.

The cooling problem has also been addressed in U.S. Pat. No. 7,362,372, which discloses a video surveillance camera comprising a housing with two chambers separated by a thermal barrier. This is also a complex design which would become even more complex if it were to be designed to accommodate different choices of lens for the camera inside the internal chamber.

It is also known to provide housings where one part of the housing moves in translation or rotation relative to another part of the housing. Such concepts are, e.g., shown in U.S. Pat. No. 5,563,659.

All in all, there exists a market need to provide an improved camera concept which may be used for outdoor placement, which addresses the cooling problem, which allows for use of different lenses and which may be used to address different protection classifications.

SUMMARY

An improved camera concept is disclosed. The improved camera concept may be used for outdoor placement. The improved camera concept addresses the cooling problem. The improved camera concept allows for use of different lenses. The improved camera concept may be used to address different protection classifications.

This object has been achieved by a camera, comprising: a housing; an electronics unit comprising a processor; and an image sensor unit comprising an image sensor and a lens support, the electronics unit being fixed inside the housing, the image sensor unit being slidable inside the housing, the housing being provided with a window through which a scene is viewable for the image sensor, the image sensor unit being slidable relative to the housing so as to allow adjustment of a distance between the image sensor and the window along an adjustment direction, wherein the electronics unit and the image sensor unit are connected to each other via a flexible cable for transmitting digital image sensor output from the image sensor to the processor in the electronics unit.

This basic design provides an improved camera concept which takes into account the desire to use it for outdoor placement, addresses the cooling problem, allows for use of different lenses and may be used to address different protection classifications.

By providing a sensor unit comprising an image sensor and a lens support, wherein the sensor unit is able to slide or translate relative to the housing so as to allow adjustment of a distance between the image sensor and the window along an adjustment direction, it is possible to easily allow for use of different lenses. The fact that the sensor unit comprising the lens support is able to slide or translate relative to the housing in the manner mentioned above may also be used for adjusting the distance between the window and any lens mounted to the lens support. With this adjustment of the distance between the lens and the window it is easy to select if the lens should be as close as possible to the window, or if there should be a specific distance between them. As close as possible is typically desirable from an imaging perspective, since it typically minimises disturbing reflections. However, in order to make the camera more resistant, e.g., against vandalism, it is often necessary to have the lens retracted a certain distance from the window such that a certain impact on the window does not damage the lens or camera. Such issues are, e.g., addressed in the International standard IEC 62262 "Degrees of protection provided by enclosures for electrical equipment against external mechanical impacts (IK code)".

By providing an electronics unit comprising a processor, wherein the electronics unit is fixed inside the housing, it is easy to provide sufficient cooling. The processor is typically a major source of heat in a camera. By providing the processor in a fixed location in the housing, the housing may be designed to provide sufficient cooling at this specific location. There is no need to provide any complicated systems with fans or the like to be able to take into account that the heat dissipating processor may be at different locations in the housing, e.g., when different lenses are used. The fact that the electronics unit with the processor is at a fixed position makes it possible to, e.g., provide a heatsink in the wall of the housing efficiently dissipating any heat from the processor to the outside environment.

Connecting the electronics unit and the image sensor unit to each other via a flexible cable for transmittal of digital image sensor output from the image sensor to the processor in the electronics unit further improves the above advantages. By having a flexible cable it is easy to connect the fixed electronics unit with the sensor unit being able to translate or slide and to allow the sensor unit to be positioned at different positions. By having the cable transmitting digital image sensor output from the image sensor to the processor in the electronics unit, there is none or minimal need for any heat dissipating electronics equipment on the sensor unit, and the heat dissipating processor may be positioned in a fixed position, thereby facilitating heat dissipation from the processor to the outside environment.

Embodiments appear in the dependent claims and in the description.

In an embodiment the digital image sensor output is pixel data coming directly from the image sensor. Preferably, respective pixel data are not influenced by surrounding pixels' pixel data. Preferably, the pixel data have only been A/D converted. It may be noted that with CMOS sensors, the A/D conversion is typically done on the sensor chip, whereas for CCD sensors, the A/D conversion is done on another chip. The digital image sensor output is preferably pixel data that has not yet been processed to be influenced by neighbouring pixels by, e.g., demosaicing, noise filtering, colour adjustment, sharpening, or colour space conversion.

The housing may support the image sensor unit in a translating and locking manner inside the housing, whereby the sensor unit is lockable relative to the housing at a selectable distance among a plurality of different distances between the image sensor and the window. In this way, the distance between the sensor unit and the window may be locked at different locations, e.g., allowing the use of different lenses.

The housing may be provided with one or more elongate guides extending along the adjustment direction and the image sensor unit may comprise a sled adapted to slide along the guides so as to allow adjustment of the distance between the image sensor and the window. By providing elongated guides, a controlled sliding of the sled is enabled.

The sled may be provided with:

a) one or more through-going openings through which the one or more guides extend along the adjustment direction, thereby allowing the sled to be retained by the one or more guides during the adjustment of the distance between the image sensor and the window, or b) one or more through-going recesses through which the one or more guides extend along the adjustment direction, wherein at least one recess alone or at least two recesses together are shaped such that the sled is provided with one or more retaining portions interacting with the one or more guides, thereby allowing the sled to be retained by the one or more guides during the adjustment of the distance between the image sensor and the window.

By providing the sled with through-going openings through which the guides extend, the sled is retained by the guides, thereby eliminating the risk that the sled is accidentally dropped during installation of a lens and during adjustment of the distance between the image sensor and the window. The respective opening extends around the cross-section of the associated guide.

A retaining effect may also be provided with through-going recesses in the sled. The through-going recesses do not extend around the entire cross-section of the associated guide. The retaining effect is provided by at least one recess alone or at least two recesses together being shaped such that the sled is provided with one or more retaining portions interacting with the one or more guides. The retaining portions may, e.g., be two portions interacting with the stem of a T-shaped guide. The retaining portions may, e.g., be two portions, with one extending underneath one of two parallel guides and the other extending underneath the other guide.

The sled may, e.g., be provided with three consecutive portions as seen along a first transverse direction being transverse to the adjustment direction, wherein the three consecutive portions are a comparably wide portion, a comparably narrow portion and a comparably wide portion as seen along a second transverse direction being transverse to the adjustment direction and the first transverse direction. The comparably narrow portion is located between two parallel guides and the comparably wider portions extend underneath and above the guides, respectively, thereby providing a retaining effect.

The recess may, e.g., be provided with two consecutive portions as seen along a first transverse direction being transverse to the adjustment direction, wherein the two consecutive portions are a comparably wide portion and a comparably narrow portion as seen along a second transverse direction being transverse to the adjustment direction and the first transverse direction. The recess may e.g. be formed as a T, with the stem forming the comparably narrow portion.

The one or more guides may be movable between a locking position and an adjustment position, wherein, in the locking position of the one or more guides, the sled is locked in position, wherein, in the adjustment position of the one or more guides, the sled is supported in translation allowing adjustment of the distance between the image sensor and the window.

By having the lock and release function performed by the guides, it is possible to design the sled compactly since there is no need to provide any lock and release function nor any need to provide room for allowing access for maneuvering such a lock and release function on the sled. By being able to design the sled compactly, it is possible to keep the camera compact in relation to the adjustment distance achieved.

The one or more guides, when in the locking position, may bias a locking portion of the sled into engagement with a locking portion of the housing, thereby locking the image sensor unit relative to the housing at a selectable distance among a plurality of different distances between the image sensor and the window. This provides a compact solution. It also provides a possibility to provide a strong locking effect even with comparably weak bias from the guides, since the locking portion of the sled and the locking portion of the housing, e.g., may be designed with ratchets interacting with each other, or with high friction materials.

The one or more guides may each be formed as a bar extending through and along the adjustment direction through-going opening or recess formed in the sled. The bar may be circular or have any other shape. Preferably, the bar has a uniform, or at least substantially uniform, cross-section along its length.

In an embodiment, the one or more guides are each formed as a bar extending through an along the adjustment direction through-going opening formed in the sled. This is a robust manner of providing the translation and retaining function. By designing the through-going openings with a cross-sectional dimension only slightly larger than the cross-section of the bar, it is also easy to provide the locking function.

The respective bar may be connected to the housing at two connection points between which the bar extends to form the guide, wherein the respective bar is connected in a locking and partly releasable manner at at least one of the connection points allowing the guide formed by the bar to assume the locking position and the adjustment position, respectively. This is a robust manner of providing the releasing and locking effect. In an embodiment, the respective bar is connected in a locking and partly releasable manner at both connection points, allowing the guide formed by the bar to assume the locking position and the adjustment position, respectively.

The respective guide may be spring-loaded relative to the housing towards the adjustment position and forced towards the locking position relative to the housing by one or more threaded members interacting with the housing in a threaded manner.

The spring-loaded effect may be accomplished in different ways. According to one variant there may be a compression spring acting between the guide and the housing and exerting a force onto the guide towards the adjustment position. According to one variant there may be a compression spring acting on the threaded member and the threaded member may be adapted to be able to exert force in both axial directions of the threaded member on the guide. According to one variant the guide may be attached to the housing with an arrangement including a non-locking wedging interaction exerting a force onto the guide towards the adjustment position. According to one variant the sensor unit or the sled may have an abutment portion interacting with an abutment portion of the housing, wherein the abutment portions are located relative each other and relative to the locking portions of the sled and the housing such that there is a small play between the locking portions when the guide is in the adjustment position, and wherein the locking portion of the sled is moved in a resilient manner into engagement with the locking portion of the housing when the guide is in the locking position.

The image sensor unit may comprise an image sensor support being rotatable relative to the image sensor unit about a normal to a sensor surface of the image sensor, whereby the image sensor unit may be positioned to view the scene using a first format and a second format, wherein in the second format the image sensor is rotated 90 degrees about the normal in relation to the first format. In this way it is possible to select a suitable format with a minimum of effort, thereby easily taking into account different aspects, such as the scene to be viewed.

The electronics unit may be arranged in contact with a heat sink which extends through a wall of the housing, thereby providing dedicated thermal communication between the electronics unit and the outside of the housing. This way heat from the processor is efficiently dissipated out from the housing.

The housing is preferably elongated along a longitudinal axis with the window being located in a front end surface and the electronics unit being positioned at a rear portion of the housing, wherein the image sensor unit is able to slide along the longitudinal axis. This configuration makes it possible to make good use of the available space in the housing and it is possible to provide good separation between the heat dissipating processor and the heat sensitive image sensor.

The housing may be formed of a polymeric material. This way it is possible to provide a light weight camera. Polymeric materials may also allow use of efficient manufacturing processes.

When the camera is actually used, it typically comprises a lens attached to the lens support. However, since the camera is designed to allow the end user to make a choice of lens within a great number of different lenses, it is conceivable that the camera as such may be marketed as a product without the lens attached, and that the end user separately acquires the lens and attaches the lens to the lens support.

A further scope of applicability of the present disclosure will become apparent from the detailed description given below. However, it should be understood that the detailed description and specific examples, while indicating embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the claims, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where:

FIG. 7 is an exploded perspective view showing the attachment of bar shaped guides to the housing of the camera;

FIG. 8 is a sideview showing the ratchet shaped locking portions of the housing and of the sled;

FIG. 9 is a cross-sectional view showing the interaction between the bar shaped guides and the sled;

DETAILED DESCRIPTION

Figure 1:
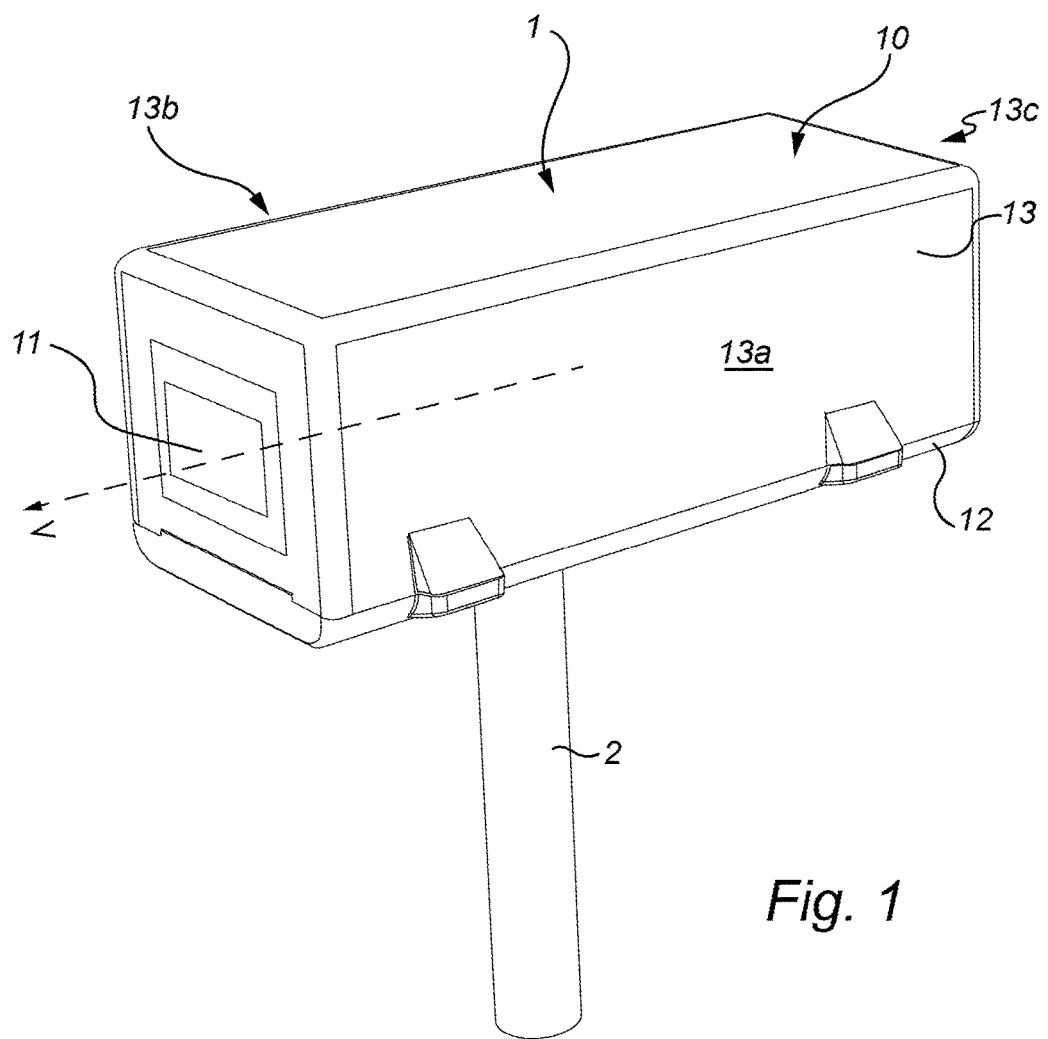
FIG. 1 is a perspective view of a camera, such as a surveillance camera, mounted on a post.

As shown in FIG. 1, the camera comprises a housing 10 which is provided with a window 11. The housing is formed of a support member 12 and a box-like top part 13. The box-like top part 13 comprises two side walls 13a, 13b and two end walls 13c, 13d. The window 11 is provided in the front end wall 13d. The camera 1 may, e.g., be mounted on a post 2.

Figure 2:
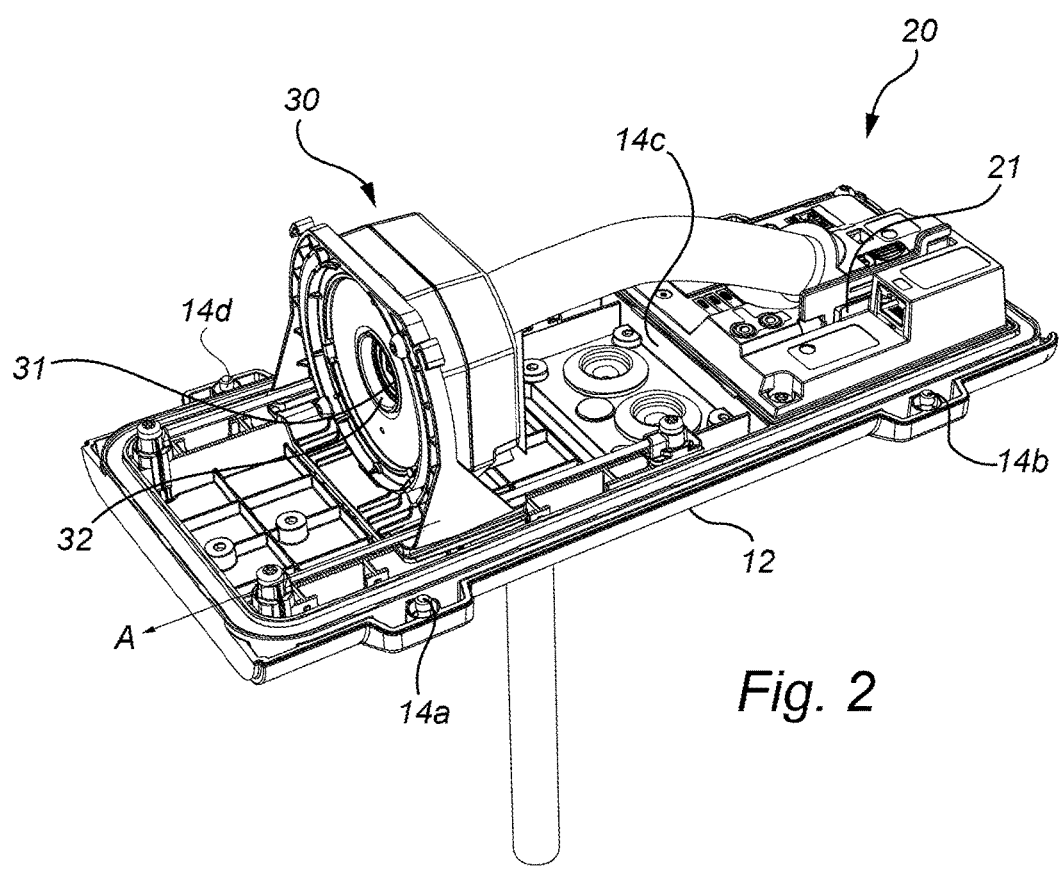
FIG. 2 is a perspective view of the camera with a top part of a housing removed.
Figure 10:
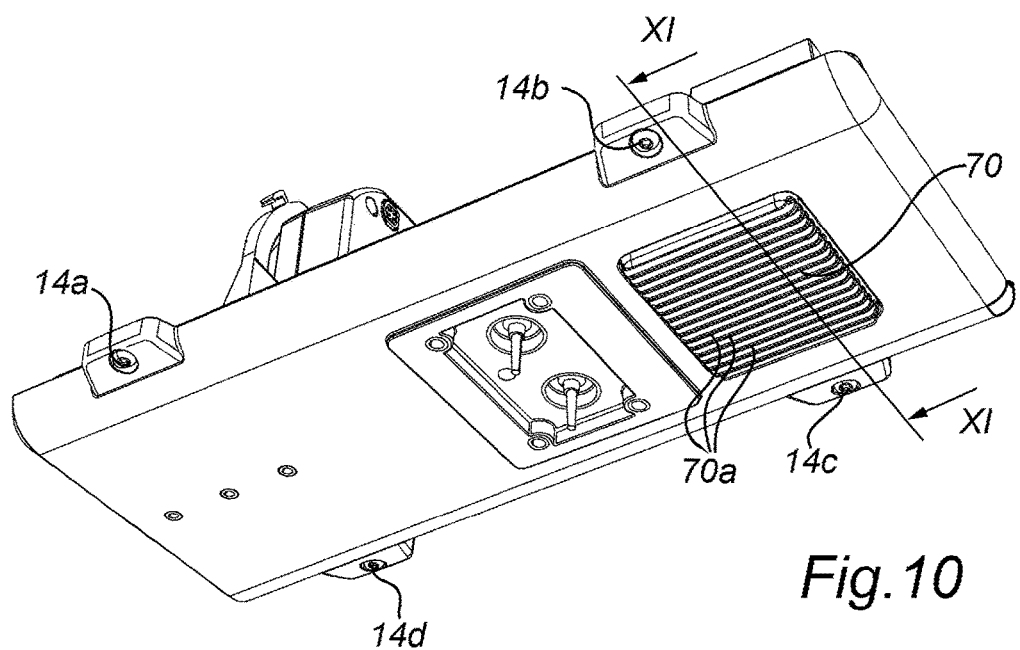
FIG. 10 is a perspective view of the camera as seen from the underside.

As shown in FIG. 2, and also in FIG. 10, the top part 13 may be attached to the support plate 12 by screws 14a-d extending through holes in the support plate and interacting with the top part 13. A sealing function is provided in the interface between the top part 13 and the support plate 12. This may, e.g., be achieved by the support plate 12 carrying a gasket in a groove. Alternatively it may be achieved by the support plate 12 being provided with a groove into which the free edges of the sidewalls 13a-d of the top part 13 extend. Of course, it is obvious for a person skilled in the art that the exact configuration of the sealing function may be different from these examples.

As shown in FIG. 2, the camera 1 further comprises an electronics unit 20 comprising a processor 21. The electronics unit 20 is fixed inside the housing 10. The electronics unit 20 is fixed to the support member 12.

The camera 1 further comprises an image sensor unit 30 comprising an image sensor 31 (shown, e.g., in FIG. 6) and a lens support 32. The image sensor unit 30 is able to slide inside the housing 10 along an adjustment direction A.

The image sensor 31 is arranged in the housing 10 such that a scene is viewable for the image sensor 31 through the window 11 of the housing 10.

Figure 5:
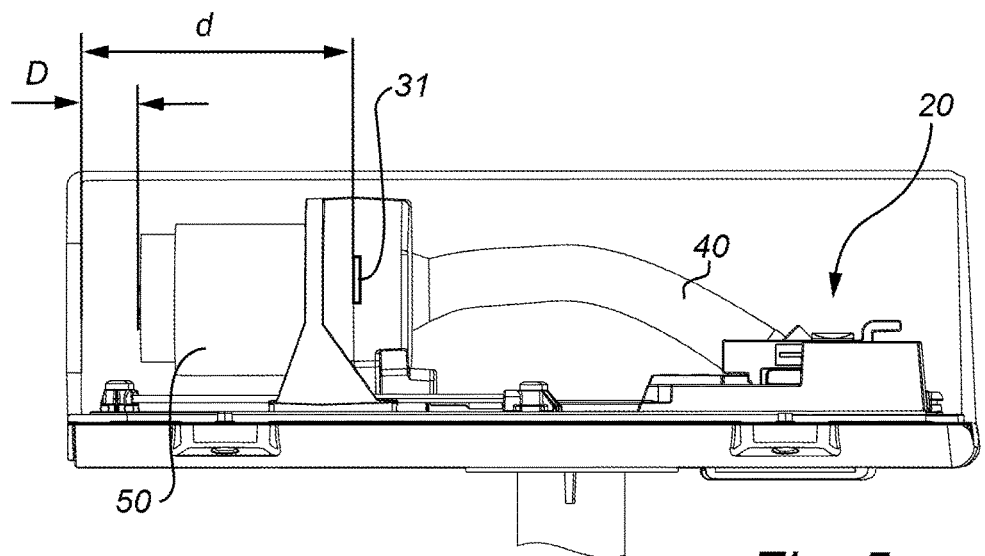
FIG. 5 is a side view with a side wall removed.
Figure 6:
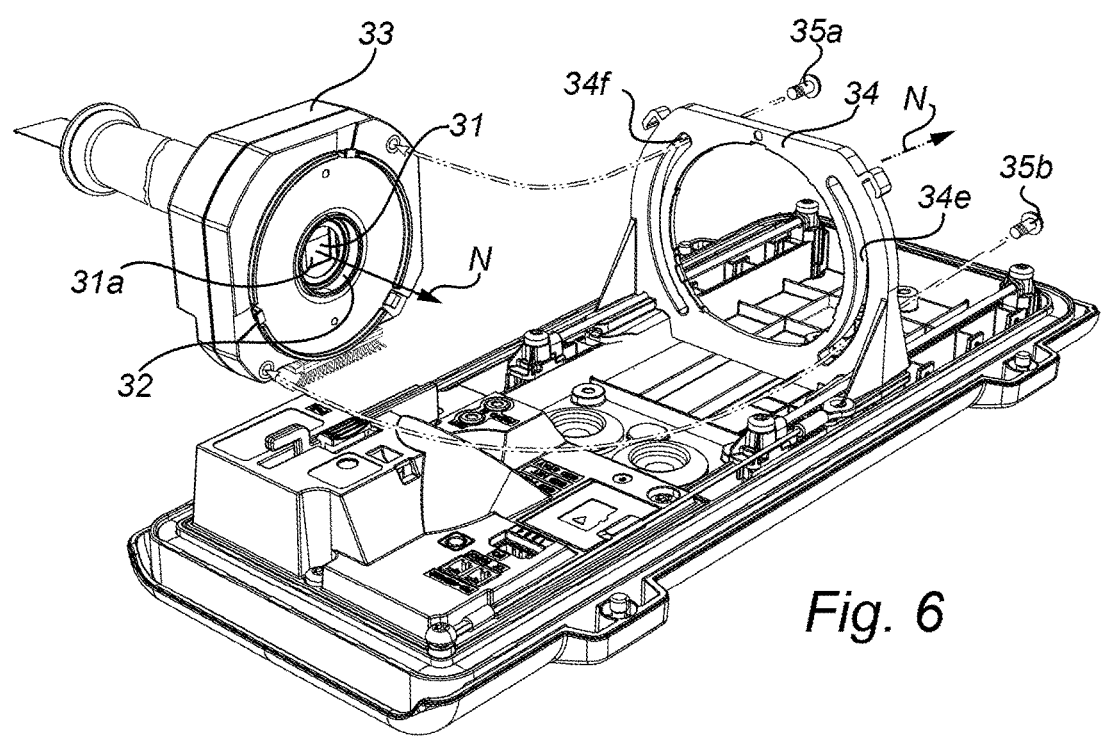
FIG. 6 is an exploded perspective view showing the attachment of an image sensor to a sled, both forming part of a sensor unit.

The image sensor unit 30 is able to slide relative to the housing 10 so as to allow adjustment of a distance d between the image sensor 31 and the window 11 along the adjustment direction A. The distance d is shown in the side views of FIG. 5 and FIG. 13 and is indicated in the perspective views of FIG. 3 and FIG. 4. The sensor unit 31 has been drawn in FIGS. 5 and 13, although it is embedded in an image sensor housing 33 as shown in FIG. 6, where the light sensitive rectangular area of the image sensor 31 is shown.

The electronics unit 20 and the image sensor unit 30 are connected to each other via a flexible cable 40 for transmittal of digital image sensor output from the image sensor 31 to the processor 21 in the electronics unit 20.

When the camera 1 is actually used, it typically comprises a lens 50 attached to the lens support 32.

Figure 3:
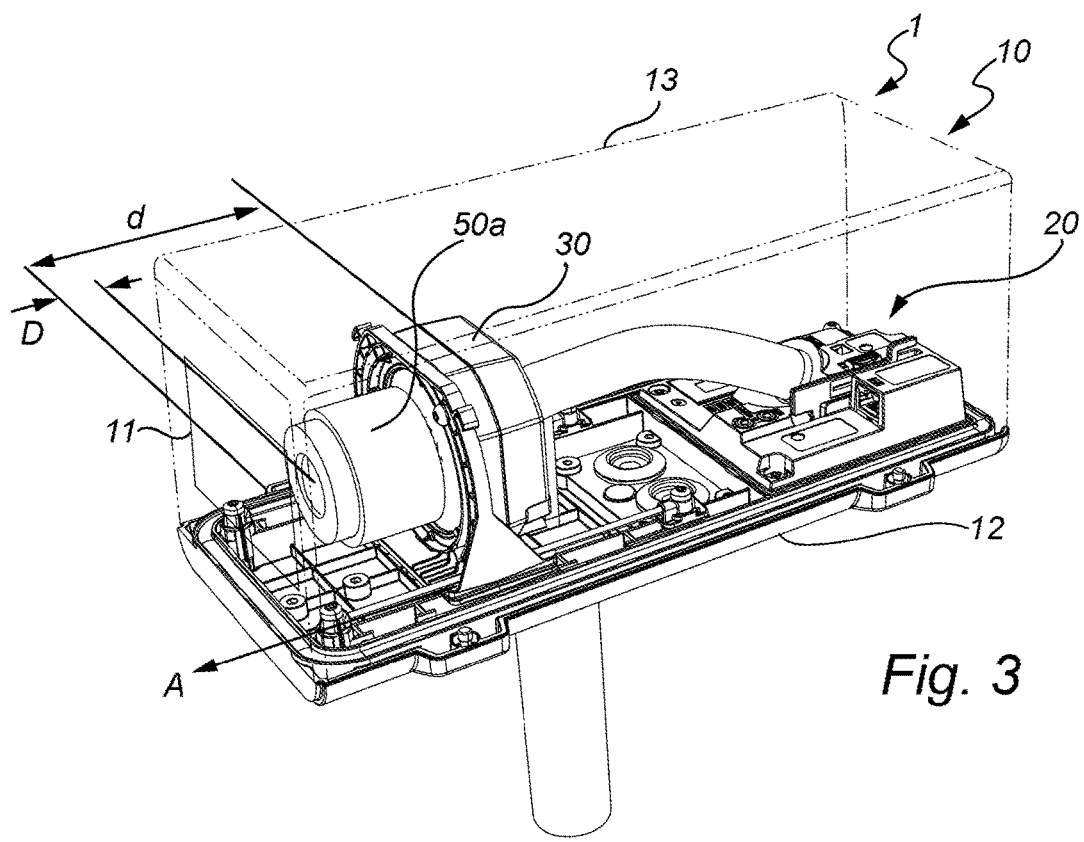
FIG. 3 is a perspective view of the camera with a lens attached to the lens support and with the top part of the housing indicated in dash-dotted lines.
Figure 4:
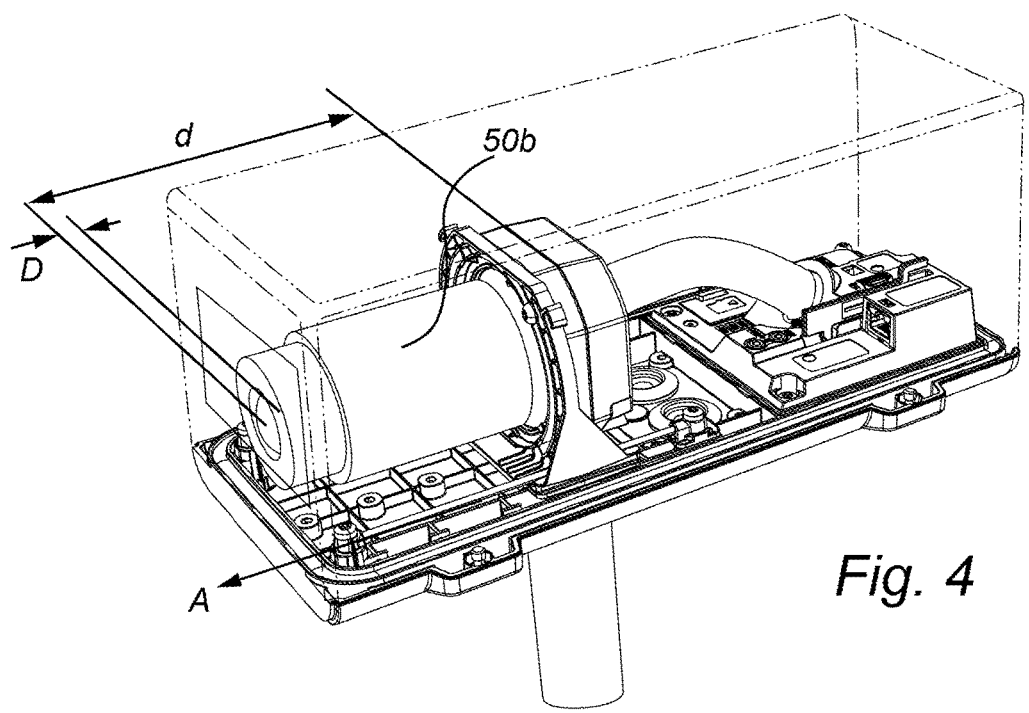
FIG. 4 corresponds to FIG. 3 but discloses a different lens attached to the lens support.

As is shown in FIGS. 3 and 4, the sensor unit 30 may be positioned at different positions along the adjustment direction A. In FIG. 3 a first lens 50a is attached to the lens support 32 and in FIG. 4 another lens 50b is attached to the lens support 32.

The fact that the sensor unit 30 comprising the lens support 32 is able to slide relative to the housing 10 in the manner mentioned above may also be used for adjusting the distance D between the window 11 and any lens 50 mounted to the lens support 32. The distance D is shown in the side view of FIG. 5 and is indicated in the perspective views of FIG. 3 and FIG. 4.

In FIG. 3 it is disclosed how a lens 50a is attached to the lens support 32 and how the sensor unit 30 is positioned relative to the housing 10 and thus relative to the window 11 such that there is a certain distance D between the front end of the lens 50a and the inside of the window 11. This may, e.g., be used for addressing the International standard IEC 62262 "Degrees of protection provided by enclosures for electrical equipment against external mechanical impacts (IK code)".

In FIG. 4 it is disclosed how a lens 50b is attached to the lens support 32 and how the sensor unit 30 is positioned relative to the housing 10 and thus relative to the window 11, such that there is no distance or close to no distance D between the front end of the lens 50b and the inside of the window 11.

In an embodiment, the digital image sensor output is pixel data coming directly from the image sensor 31. Preferably these pixel data are not influenced by surrounding pixels' pixel data. Preferably the pixel data have only been A/D converted. The digital image sensor output is preferably pixel data that have not yet been processed to be influenced by neighbouring pixels by, e.g., demosaicing, noise filtering, colour adjustment, sharpening, or colour space conversion.

As is shown in FIG. 7, the housing 10 is provided with two elongate bars 60a, 60b forming part of two guides. The bars 60a, 60 extend along the adjustment direction A. Furthermore, the image sensor unit 30 comprises a sled 34 adapted to slide along the guides 60a, 60b.

The sled 34 is provided with through-going openings 34a, 34b through which the guides 60a and 60b extend along the adjustment direction A, thereby allowing the sled 34 to be retained by the guides 60a, 60b during the adjustment of the distance d between the image sensor 31 and the window 11.

Each bar 60a, 60b is, as shown in FIG. 7, connected to the support member 12 at two connection points between which the bar extends to form the guide.

As shown in FIG. 8, the guides 60a, 60b are movable between a locking position PL and an adjustment position PA. The locking position PL is the position indicated with solid lines. The adjustment position PA is the position indicated with dashed lines.

The bars 60a, 60b and the through-going openings 34a, 34b have uniform circular cross-section. The size of the through-going openings 34a, 34b is slightly larger than the size of the bars 60a, 60b such that the sled 34 may slide along the bars 60a, 60b. However, the through-going openings 34a, 34b are only slightly larger than the bars 60a, 60b such that any transverse movement of the bars 60a, 60b will result in a transverse force onto and a transverse movement of the sled 34. This latter is used for moving the sled 34 as the guides 60a, 60b are moved between the locking position PL and the adjustment position PA. The sled 34 is locked in position when the guides are in the locking position PL. The sled 34 is supported in a slidable manner allowing adjustment of the distance d between the image sensor 31 and the window 11 when the guides 60a, 60b are in the adjustment position PA.

As shown in FIG. 8, the guides 60a, 60b bias or force locking portions 34c, 34d of the sled 34 into engagement with associated locking portions 12c, 12d of the support member 12. The locking portions 34c-d, 12c-d are designed with ratchets interacting with each other, thereby being able to lock the image sensor unit 30 relative to the housing 10 at a selectable distance between the image sensor 31 and the window 11.

Each guide is spring-loaded relative to the support member 12 towards the adjustment position PA and forced towards the locking position PL relative to the housing by threaded members 61-64 interacting in a threaded manner with the support member 12.

The spring-loaded effect may be accomplished in different ways. According to one variant there may be a compression spring 61a, 62a, 63a, 64a acting between the guide and the housing and exerting a force onto the guide towards the adjustment position. According to one variant there may be a compression spring acting on the threaded member and the threaded member may be adapted to be able to exert force in both axial directions of the threaded member on the guide. According to one variant the guide may be attached to the housing with an arrangement including a non-locking wedging interaction exerting a force onto the guide towards the adjustment position. According to one variant the sensor unit or the sled may have an abutment portion interacting with an abutment portion of the housing, wherein the abutment portions are located relative each other and relative to the locking portions of the sled and the housing such that there is a small play between the locking portions when the guide is in the adjustment position, and wherein the locking portion of the sled is moved in a resilient manner into engagement with the locking portion of the housing when the guide is in the locking position.

As shown in FIG. 6, the sensor housing or sensor support 33 is rotatable relative to the sled 34 about a normal N to the sensor surface 31a of the image sensor 31. The sensor support 33 is attached to the sled 34 by two members, preferably threaded members 35a, 35b. The members 35a, 35b are fixed relative to the sensor support 33 and are able to slide relative to the sled 34 in two arc-shaped through-going long holes 34e, 34f. Thereby the image sensor 31 may be positioned to view the scene using a first format and a second format, such as a regular landscape format and a corridor format, wherein in the second format the image sensor 31 is rotated 90 degrees about the normal N in relation to the first format.

Figure 11:
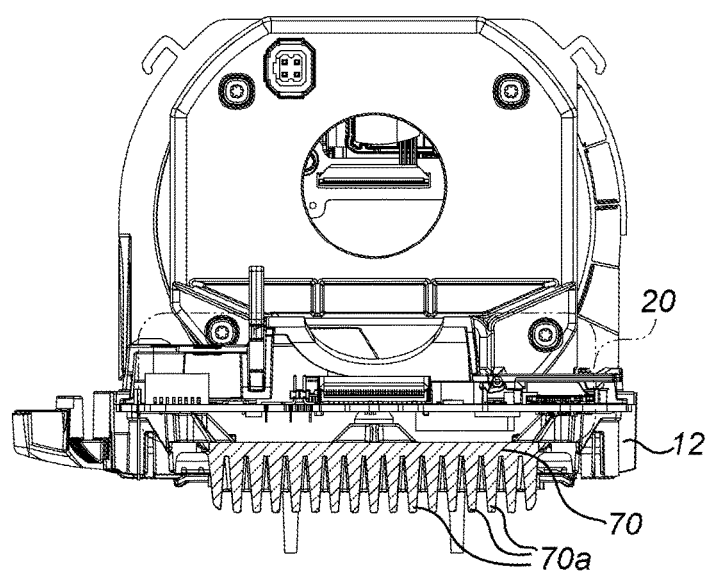
FIG. 11 is a cross-section along line XI-XI in FIG. 10.

As is shown in FIGS. 10 and 11, the electronics unit 20 is arranged in contact with a heat sink 70 which extends through a wall formed by the support member 12 of the housing 10. The heat sink 70 is formed of a metallic material and is provided with a plurality of fins 70a. Basically, the electronics unit 20 is attached to a rear portion of the support member 12 and a large proportion of the support member 12 is provided with a heat sink 70 at this rear portion.

The housing 10 is elongated along a longitudinal axis L with the window 11 being located in a front end surface 13d and the electronics unit 20 being positioned at a rear portion of the housing 10, wherein the image sensor unit 30 is slidable along the longitudinal axis L.

The housing 10 (apart from the heat sink portion 70) is formed of a polymeric material.

Figure 12:
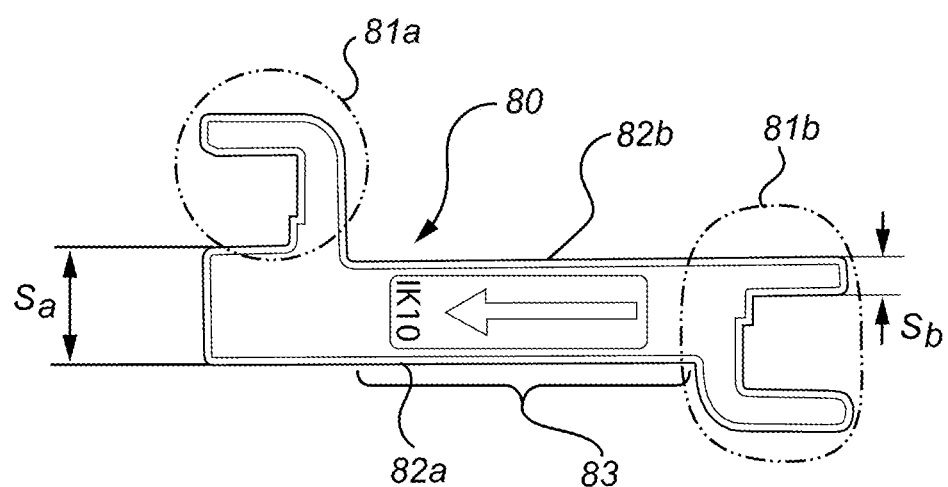
FIG. 12 is a plan view of a tool designed to be used as a positioning tool to provide correct positioning of the front end of the lens relative to the window of the camera.

In FIG. 12 there is disclosed a tool 80 which facilitates correct positioning of the lens 50 relative to the window 11. When the installer wants to adjust the position of the sensor unit 31, the top part 13 of the housing 10 is removed and thereby there is no window 11 present to position the lens 50 relative to.

Figure 13:
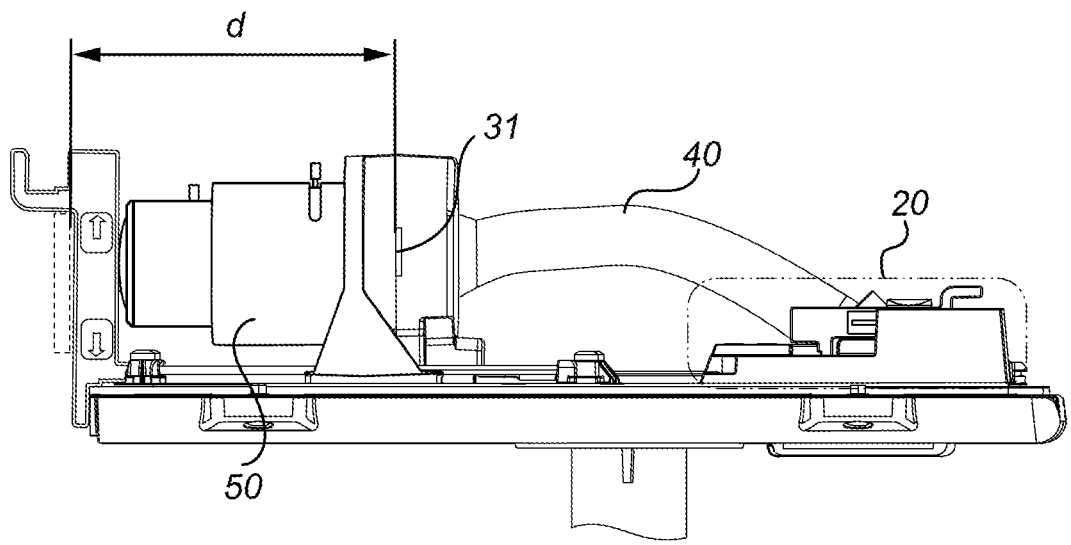
FIG. 13 is a side view showing the tool of FIG. 12 in use.

The tool 80 is provided with a first grip portion 81a at one end of the tool 80 and a second grip portion 81b at the opposite end of the tool 80. Each grip portion 81a, 81b is profiled and adapted to interact with a profile of the support plate 12 and thereby be well-defined in position relative to the support plate 12. This is shown in FIG. 13.

The tool 80 is furthermore provided with a first abutment surface 82a which is adapted to face the lens 50 and be abutted by the lens 50 when the first grip portion 81a interacts with the support plate 12. The tool 80 is furthermore provided with a second abutment surface 82b which is adapted to face the lens 50 and be abutted by the lens 50 when the second grip portion 81b interacts with the support plate 12. The first and second abutment portions 82a, 82b are positioned on opposite sides of a central portion 83 of the tool 80. The first and second abutment surfaces 82a, 82b are shifted different distances $S_a$, $S_b$ in directions being normal to the respective abutment surface 82a, 82b, whereby a lens 50 adjusted into abutment to the first abutment surface 82a will ultimately be positioned at a different distance to the window 11 than a lens adjusted into abutment to the second abutment surface 82b. This may, e.g, be used for addressing the International standard IEC 62262 "Degrees of protection provided by enclosures for electrical equipment against external mechanical impacts (IK code)". In the embodiment of the tool 80 in FIG. 12, the first grip portion 81a and the first abutment surface 82a are positioned relative to each other such that the front end of the lens will be retracted a distance from the window 11 and the second grip portion 81b and the second abutment surface 82b are positioned relative to each other such that the front end of the lens will be close to the window 11.

It is contemplated that there are numerous modifications of the embodiments described herein, which are still within the scope of the disclosure as defined by the claims.

The sled may instead of through-going openings be provided with one or more through-going recesses through which the one or more guides extend along the adjustment direction, wherein at least one recess alone or at least two recesses together are shaped such that the sled is provided with one or more retaining portions interacting with the one or more guides, thereby allowing the sled to be retained by the one or more guides during the adjustment of the distance between the image sensor and the window.

The retaining effect may be provided with through-going recesses in the sled even though the through-going recesses do not extend fully around the cross-section of the associated guide. The retaining effect may be provided by at least one recess alone or at least two recesses together being shaped such that the sled is provided with one or more retaining portions interacting with the one or more guides. The retaining portions may, e.g., be two portions interacting with the stem of a T-shaped guide. The retaining portions may, e.g., be two portions, with one extending underneath one of two parallel guides and the other extending underneath the other guide.

The sled may, e.g., be provided with three consecutive portions as seen along a first transverse direction being transverse to the adjustment direction, wherein the three consecutive portions are a comparably wide portion, a comparably narrow portion and a comparably wide portion as seen along a second transverse direction being transverse to the adjustment direction and the first transverse direction. The comparably narrow portion is located between two parallel guides and the comparably wider portions extend underneath respectively above the guides, thereby providing a retaining effect.

The recess may, e.g., be provided with two consecutive portions as seen along a first transverse direction being transverse to the adjustment direction, wherein the two consecutive portions are a comparably wide portion and a comparably narrow portion as seen along a second transverse direction being transverse to the adjustment direction and the first transverse direction. The recess may, e.g., be formed as a T, with the stem forming the comparably narrow portion.

As an alternative to providing the locking portion of the sled and the locking portion of the housing with ratchets interacting with each other, the locking portions may be provided high friction materials.

The bars forming the guides need not be circular, but may have any other shape. However, the bar preferably has a uniform, or at least substantially uniform, cross-section over the length along which the image sensor unit may be slid.

In addition to the processor, the electronics unit may also hold other components, such as a memory and a network interface. Further, the electronics unit may have connectors such as a power connector, an Ethernet connector, and or an I/O connector. The electronics unit may also be provided with buttons, such as an on/off button or a reset button, for operating the camera. Still further, the electronics unit may have indicators, such as LEDs, for indicating status of the camera to a user.

It may be noted that the image sensor may be any kind of image sensor, such as an image sensor employing visible light, an IR sensor or a thermal sensor, such as a microbolometer.

Further, the processor may be any kind of processor, e.g., a central processing unit (CPU), a graphics processing unit (GPU), a custom made processing device implemented in an integrated circuit, an ASIC, an FPGA, or logical circuitry including discrete components.

What is claimed is:

1. A camera, comprising:
    a housing;
    an electronics unit comprising a processor; and
    an image sensor unit comprising an image sensor and a lens support,
    the electronics unit being fixed inside the housing,
    the housing being provided with a window through which a scene is viewable for the image sensor,
    the image sensor being arranged in the housing such that a scene is viewable for the image sensor through the window of the housing,
    the image sensor unit being slidable inside the housing relative to the housing so as to allow adjustment of a distance between the image sensor and the window through which the scene is viewable for the image sensor along an adjustment direction,
    wherein the electronics unit and the image sensor unit are connected to each other via a flexible cable for transmittal of digital image sensor output from the image sensor to the processor in the electronics unit.

2. The camera according to claim 1, the housing supporting the image sensor unit in a slidable and locking manner inside the housing, whereby the sensor unit is lockable relative to the housing at a selectable distance among a plurality of different distances between the image sensor and the window.

3. The camera according to claim 1, wherein the housing is provided with one or more elongate guides extending along the adjustment direction and the image sensor unit comprising a sled adapted to slide along the guides so as to allow adjustment of the distance between the image sensor and the window.

4. The camera according to claim 3, wherein the sled is provided with one or more through-going openings through which the one or more guides extend along the adjustment direction, thereby allowing the sled to be retained by the one or more guides during the adjustment of the distance between the image sensor and the window.

5. The camera according to claim 4, wherein the one or more guides are each formed as a bar extending through and along the adjustment direction through-going opening or recess formed in the sled.

6. The camera according to claim 5, wherein the respective bar is connected to the housing at two connection points between which the bar extends to form the guide, wherein the respective bar is connected in a locking and partly releasable manner at at least one of the connection points allowing the guide formed by the bar to assume a locking position and an adjustment position, respectively.

7. The camera according to claim 6, wherein the one or more guides, when in the locking position, bias a locking portion of the sled into engagement with a locking portion of the housing, thereby locking the image sensor unit relative to the housing at a selectable distance among a plurality of different distances between the image sensor and the window.

8. The camera according to claim 6, wherein the respective guide is spring-loaded relative to the housing towards the adjustment position and forced towards the locking position relative to the housing by one or more threaded members interacting in a threaded manner with the housing.

9. The camera according to claim 3, wherein the sled is provided with one or more through-going recesses through which the one or more guides extend along the adjustment direction, wherein at least one recess alone or at least two recesses together are shaped such that the sled is provided with one or more retaining portions interacting with the one or more guides, thereby allowing the sled to be retained by the one or more guides during the adjustment of the distance between the image sensor and the window.

10. The camera according to claim 9, wherein the one or more guides are each formed as a bar extending through and along the adjustment direction through-going opening or recess formed in the sled.

11. The camera according to claim 10, wherein the respective bar is connected to the housing at two connection points between which the bar extends to form the guide, wherein the respective bar is connected in a locking and partly releasable manner at least one of the connection points allowing the guide formed by the bar to assume a locking position and an adjustment position, respectively.

12. The camera according to claim 3, wherein the one or more guides are movable between a locking position and an adjustment position,
    wherein, in the locking position of the one or more guides, the sled is locked in position,
    wherein, in the adjustment position of the one or more guides, the sled is supported in a slidable manner allowing adjustment of the distance between the image sensor and the window.

13. The camera according to claim 1, wherein the image sensor unit comprises an image sensor support being rotatable relative to the image sensor unit about a normal to a sensor surface of the image sensor, whereby the image sensor may be positioned to view the scene using a first format and a second format, wherein in the second format the image sensor is rotated 90 degrees about the normal in relation to the first format.

14. The camera according to claim 1, wherein the electronics unit is arranged in contact with a heat sink which extends through a wall of the housing thereby providing dedicated thermal communication between the electronics unit and the outside of the housing.

15. The camera according to claim 1, wherein the housing is elongated along a longitudinal axis with the window being located in a front end surface and the electronics unit being positioned at a rear portion of the housing, wherein the image sensor unit is slidable along the longitudinal axis.

16. The camera according to claim 1, wherein the housing is formed of a polymeric material.

17. The camera according to claim 1, further comprising a lens attached to the lens support.

* * * * *